(12) United States Patent
Noguchi et al.

(10) Patent No.: US 7,468,156 B2
(45) Date of Patent: Dec. 23, 2008

(54) METHOD FOR MANUFACTURING POROUS CERAMIC STRUCTURE

(75) Inventors: Yasushi Noguchi, Toki (JP); Hiroyuki Suenobu, Suzhou (CN); Takehiko Watanabe, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 11/496,236

(22) Filed: Jul. 31, 2006

(65) Prior Publication Data
US 2007/0045910 A1    Mar. 1, 2007

(30) Foreign Application Priority Data
Aug. 12, 2005   (JP) .............................. 2005-233953

(51) Int. Cl.
*B28B 1/00*    (2006.01)
(52) U.S. Cl. ...................................... 264/630; 264/628
(58) Field of Classification Search .................. 264/628, 264/630
See application file for complete search history.

(56) References Cited

U.S. PATENT DOCUMENTS
2005/0109617 A1*  5/2005  Ono et al. .................... 204/400

FOREIGN PATENT DOCUMENTS
JP        A-2003-40687      2/2003

* cited by examiner

*Primary Examiner*—Steven P Griffin
*Assistant Examiner*—Russell J Kemmerle, III
(74) *Attorney, Agent, or Firm*—Oliff & Berridge, PLC

(57) ABSTRACT

There is provided a method for manufacturing a porous ceramic structure, including: firing a formed body containing ceramic particles and a combustible powder functioning as a pore former, and burning off the combustible powder to obtain the porous ceramic structure. The combustible powder has an exothermic rate of 0 to 35 μV·min./mg, which is obtained from a differential thermal analysis. The method for manufacturing a porous ceramic structure can inhibit a crack from being generated during firing even without slowing down the temperature rise rate at the combustion range of the pore former or without lowering an oxygen content in the firing atmosphere.

4 Claims, 2 Drawing Sheets

METHOD FOR MANUFACTURING POROUS CERAMIC STRUCTURE

BACKGROUND OF THE INVENTION AND RELATED ART STATEMENT

The present invention relates to a porous ceramic structure suitably used, for example, as a filtration material of a filter.

There has been used a porous ceramic structure containing a ceramic excellent in thermal resistance and corrosion resistance as a filtration material for filters used for an environmental measure such as antipollution or the like, or recovery of products from high temperature gas, or the like, in various fields including chemistry, electric power, steels, and industrial waste disposal. A honeycomb-shaped porous ceramic structure has suitably been used as a dust-collecting filter used at high temperature in a corrosive gas atmosphere, such as a diesel particulate filter (DPF), which traps particulate matter (PM) discharged from a diesel engine such as an automobile diesel engine.

As a porous ceramic structure used in a dust-collecting filter, there has widely been used a honeycomb-shaped porous ceramic structure 25 where a number of cells 23 are partitioned and formed by the partition walls 24, and the inlet side end face B and the outlet side end face C are alternately plugged with a plugging member 22, for example, a dust-collecting filter 21 shown in FIG. 3. According to the dust-collecting filter 21, which has such a structure, when the target gas $G_1$ introduced in a part of the cells 23 from the inlet side end face B passes through the partition walls 4 and flows into the adjacent cells 23, particulate matter containing the target gas $G_1$ is trapped in the partition walls 24. Then, treated gas $G_2$, which has passed through the partition walls 24 and flew in the adjacent cells 23, is discharged from the outlet side end face C. Therefore, treated gas $G_2$, where particulate matter in the target gas $G_1$ is separated and removed, can be obtained.

By the way, in recent years, a porous ceramic structure having high porosity has been demanded because of the necessity of improving treatability of a duct-correcting filter by reducing a pressure loss when gas passes through partition walls. When such a porous ceramic structure having high porosity is manufactured, generally a combustible power which functions as a pore former is added to a forming raw material. The combustible powder is burnt off when the formed body is fired, and pores are formed at the location where the powder has been present. Therefore, a porous ceramic structure having high porosity can be obtained. As such a combustible power to function as a pore former, there has conventionally been used a powder of starch, carbon, poly(ethylene terephthalate) (PET), poly(methyl methacrylate) (PMMA), or the like (see Patent Document 1).

Patent Document 1: JP-A-2003-40687

However, when such a combustible powder is used in great quantities, a crack is prone to be caused due to thermal stress because of high heat generation during firing the combustible powder. In order to inhibit a crack from being generated, a measure such as slowing down a temperature rise rate in a combustion range of the pore former or lowering an oxygen content in a firing atmosphere is required, and it causes increase in firing cost.

The present invention has been made in such conventional circumstances and aims to provide a method for manufacturing a porous ceramic structure, the method being capable of inhibiting a crack from being generated during firing even without slowing down the temperature rise rate at the combustion range of the pore former or without lowering an oxygen content in the firing atmosphere.

SUMMARY OF THE INVENTION

According to the present invention, there is provided a method for manufacturing a porous ceramic structure, comprising: firing a formed body containing ceramic particles and a combustible powder functioning as a pore former, and burning off the combustible powder to obtain the porous ceramic structure, wherein the combustible powder has a heat generation rate of 0 to 35 µV·min./mg, which is obtained from a differential thermal analysis.

Incidentally, in the present invention, a "heat generation rate, which is obtained from a differential thermal analysis" means the value obtained by measuring differential heat of the sample (combustible powder) by a differential thermal analysis under the measuring conditions described below, graphing the results with differential heat on the axis of ordinates and time (minute) on the axis of abscissas, obtaining integral value of heat peak by drawing a base line in a temperature range without exothermic or endothermic action from the graph, and dividing the integral value by mass of the sample. Incidentally, FIGS. 1 and 2 shows graphs of the results of measuring of a differential thermal analysis of a polyacetal powder and a poly(ethylene terephthalate) powder, respectively. A dotted line shows base line, and an oblique line portion shows an exothermic peak portion for obtaining the integral value.

[Conditions for Measurement]
  Temperature rise rate: 10° C./min.
  Air flow rate: 100 mL/min.
  Apparatus for measurement: TG-DTA2000S produced by Mac Science Co.
  Temperature for measurement: 25 to 1000° C.
  Mass of sample: apx. 10 mg According to a method for manufacturing a porous ceramic structure of the present invention, a crack can be inhibited from being generated during firing even without slowing down the temperature rise rate at the combustion range of the pore former or without lowering an oxygen content in the firing atmosphere, and as a result a firing cost can be reduced, by using a combustible powder having a low exothermic rate as a pore former in manufacturing a porous ceramic structure having high porosity.

DESCRIPTION OF PREFERRED EMBODIMENT

Figure 1:
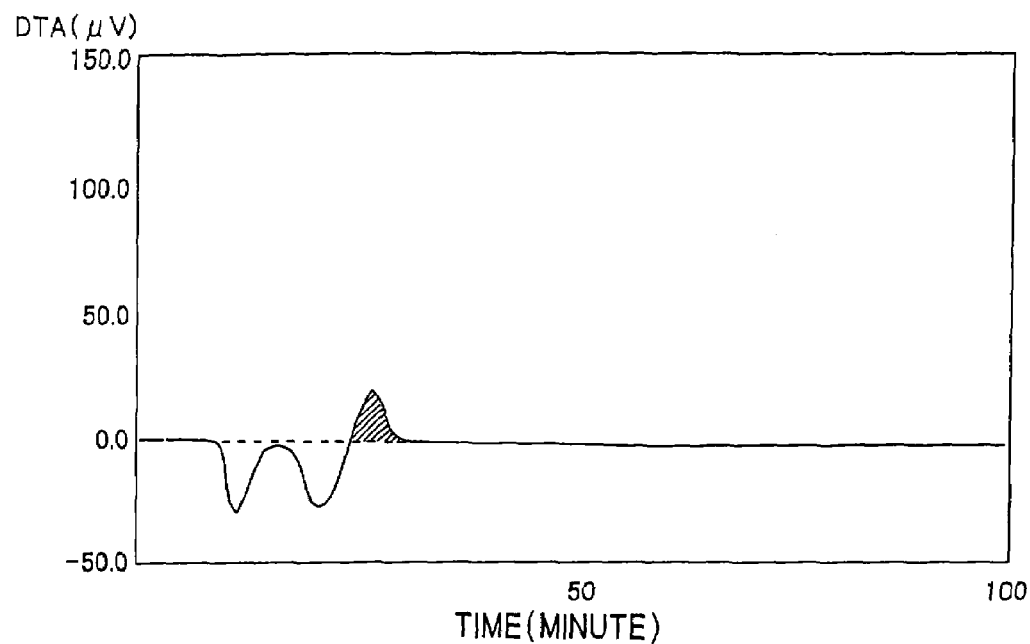
FIG. 1 is a graph (DTA curve) prepared on the basis of the results of the differential thermal analysis of a polyacetal powder.

Embodiments of the present invention will hereinbelow be described. However, the present invention is limited to the following embodiments, and it should be understand that a change, an improvement, or the like, in design may suitably be given on the basis of ordinary knowledge of those skilled in the art.

A method for manufacturing a porous ceramic structure of the present invention is a method for manufacturing a porous ceramic structure, comprising: firing a formed body containing ceramic particles and a combustible powder functioning as a pore former, and burning off the combustible powder to obtain the porous ceramic structure. This method is characterized in that the combustible powder has an exothermic rate of 0 to 35 µV·min./mg, which is obtained from a differential thermal analysis.

The inventors made researches to fined that using a combustible powder having an exothermic rate of 0 to 35 µV·min./mg, preferably 0 to 20 µV·min./mg, and more preferably 0 to 5 µV·min./mg, which is obtained from a differential thermal analysis, as a pore former upon manufacturing a porous ceramic structure adequately inhibits heat generation during firing even in the case that a relatively large amount of a pore former (combustible powder) is added in order to manufacture a porous ceramic structure having high porosity and that high thermal stress causing a crack is hardly generated.

Therefore, when a manufacturing method of the present invention is employed in manufacturing a porous ceramic structure, a porous ceramic structure with no crack can be obtained without taking a specific measure such as slowing down the temperature rise rate at the combustion range of the pore former or lowering an oxygen content in the firing atmosphere, which has been required conventionally in inhibiting a crack from being generated, even in manufacturing a porous ceramic structure using a large amount of porous material.

A manufacturing method of the present invention can be performed in the same process as in the conventional method for manufacturing a porous ceramic structure except for the use of a combustible powder having an exothermic rate as described above as a pore former. That is, to ceramic particles to function as framework raw material particles, are added an organic binder, water, and the like, besides the aforementioned combustible powder as a pore former, and they are mixed and kneaded to give a forming raw material (clay), which is then formed in a predetermined shape by various forming method. Then, the formed body is dried generally in a drying method such as hot air drying or microwave drying. Further, as necessary, cutting, grinding, or the like, is performed for the purpose of adjusting the shape, followed by firing under predetermined conditions. By this firing, the framework raw material particles are sintered for densification, and the combustible powder as a pore former is burnt off to form pores at the locations where the powder has been present. Thus, a porous ceramic structure can be obtained.

The ceramic particles functioning as framework raw material particles may be only one kind or a mixture of two or more kinds of ceramic particles. The specific kind may be selected in consideration of the use, or the like, of the porous ceramic structure. For example, in the case that a cordierite porous ceramic structure is manufactured as a filtration material of a DPF, which requires thermal resistance, there is prepared cordierite-forming raw material particles (particles of a substance which can be converted into cordierite by firing) containing, as the framework raw material particles, kaolin particles, talc particles, aluminum hydroxide particles, alumina particles, silica particles, or the like, at a predetermined ratio, and the above combustible powder, organic binder, water, and the like, are added thereto and mixed and kneaded to obtain a forming raw material.

An amount of the combustible powder functioning as a pore former is determined according to porosity or the like of a porous ceramic structure to be finally obtained. For example, it is preferable that 5 to 50 parts by mass of a combustible powder having an exothermic rate of 0 to 20 µV·min./mg, which is obtained from a differential thermal analysis, is added with respect to 100 parts by mass of ceramic particles functioning as framework raw material particles. The addition in such a manner can effectively inhibit a crack from being caused due to heat generation of the pore former during firing.

In the present invention, though there is no limitation on the combustible powder used as a pore former as long as it has an exothermic ratio within the above range, a powder of polyacetal or polylactic acid resin is particularly preferable. Many kinds of polyacetal or polylactic acid resin have remarkably low exothermic rates in comparison with poly(ethylene terephthalate) or poly(methyl methacrylate), and porous ceramic structures finally obtained by using them do not have particularly large differences from ones obtained by using conventional pore formers even in pore characteristics (pore diameter, average porosity, and the like).

There is no particular limitation on shape of a porous ceramic structure manufactured in a manufacturing method of the present invention, and a shape can be determined according to the use. For example, when it is used as a filtration material of a DPF, the structure may have a shape of a honeycomb (honeycomb structure), which is a general shape as a DPF. A porous ceramic structure having a honeycomb shape can be manufactured by drying and firing a formed body obtained by extrusion forming using a mouthpiece having desired cell shape, partition wall thickness, and cell density.

The present invention will hereinbelow be described in more detail on the basis of Examples. However, the present invention is by no means limited to these Examples.

EXAMPLES 1 TO 5, COMPARATIVE EXAMPLES 1 AND 2

There was prepared, as framework raw material particles, a material containing 5 kinds of particles of kaolin (mean particle diameter of 10 µm), talc (mean particle diameter of 30 µm), aluminum hydroxide (mean particle diameter of 3 µm), alumina (mean particle diameter of 6 µm), and silica (mean particle diameter of 20 µm) at a ratio of 19:40:15:14:12. After 6 parts by mass of hydroxypropylmethyl cellulose was added as an organic binder to 100 parts by mass of the framework raw material to give a mixture, a predetermined amount of the pore former (combustible powder) shown in Table 1 was added to the mixture, which was mixed for 3 minutes. A predetermined amount of water was further added to the mixture by spraying, and the mixture was mixed for 3 minutes. Then, the mixture was kneaded for 60 minutes with a sigma type kneader to obtain clay. The clay was further kneaded with a vacuum kneader and extruded to obtain clay formed into a cylindrical shape.

A honeycomb-shaped formed body having plurality of cells partitioned and formed by partition walls was obtained by a method where the cylindrical clay was subjected to extrusion forming using a mouthpiece having the cell shape, partition wall thickness, and cell density described below. The formation was performed with a ram extrusion molding machine. The formed body was subjected to microwave drying, and further hot air drying to obtain a dried body. The dried body was cut to have a predetermined dimensions. An adhesive sheet was applied on one of the end faces of the dried body, and holes were made only in the portions corresponding to the cells to be plugged of the adhesive sheet by laser processing utilizing image processing to give a mask. The end face having the mask of the dried body was immersed in ceramic slurry to fill the ceramic slurry into the cells to be plugged to form plugged portions. The same process was given to the other end face of the ceramic dried body, and then the plugged portions were fired together with the dried body to obtain a porous ceramic structure. As the ceramic slurry, slurry of cordierite-forming raw material particles was used. As the firing conditions, a temperature rise rate in the range from 200 to 400° C. was 4° C./hour, an oxygen content in the same temperature range was 16 to 20%, the maximum temperature was 1420° C., the firing time at the highest temperature is 6 hours, and the total firing time was 120 hours.

Figure 3:
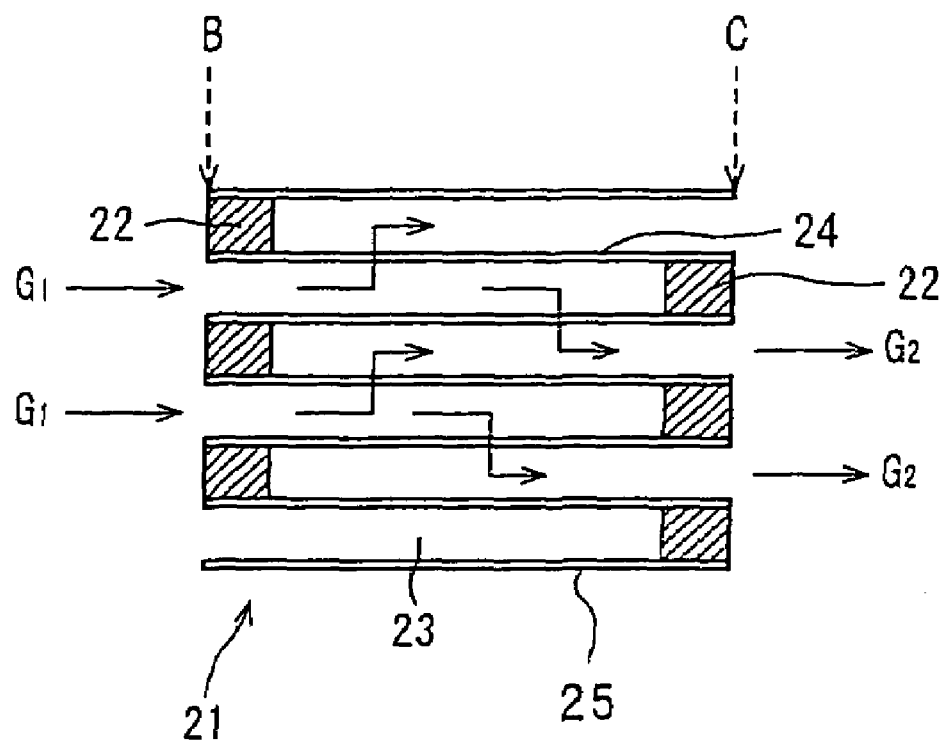
FIG. 3 is a schematic view showing an example of a dust-collecting filter using a porous ceramic structure.

The porous ceramic structure obtained above had a shape with a circular end face (cell opening face) shape having a diameter of 191 mm and with a length of 203 mm, and the porous ceramic structure had a honeycomb structure having cells each having a square shape with about 1.47 mm×1.47 mm with a partition wall thickness of 0.3 mm and a cell density of about 45 cells/cm² (300 cells/inch²). The plugged portions were formed so that adjacent cells were plugged at opposite ends as shown in FIG. 3, and each of the end faces showed a checkerwise pattern.

Figure 2:
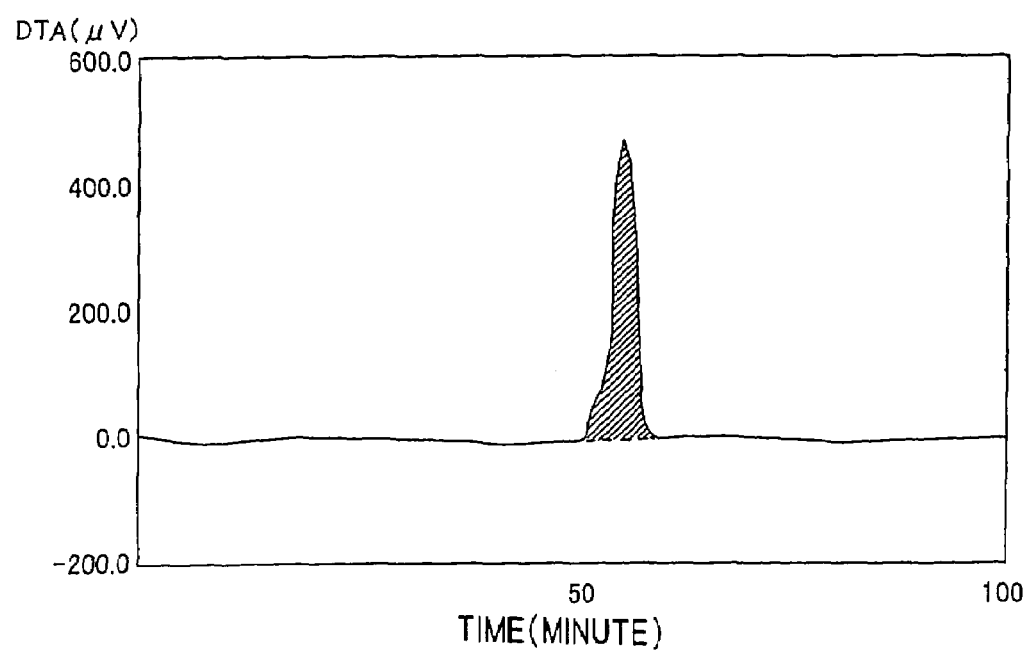
FIG. 2 is a graph (DTA curve) prepared on the basis of the results of the differential thermal analysis of a poly(ethylene terephthalate) powder.

With regard to each of the porous ceramic structures (fired bodies) obtained in Examples 1 to 5 and Comparative Examples 1 to 2 as described above, porosity and mean pore diameter were obtained with presence/absence of a firing crack being checked, and the results are shown in Table 1. Incidentally, the porosity and the mean pore diameter were calculated from the result of measurement of the pore diameter and the total pore volume by a mercury porosimetry, where mercury was put into the porous ceramic structure under pressure, using a mercury porosimeter produced by Micromeritecs Co. with a true specific gravity of cordierite of 2.52 g/cc. With respect to presence/absence of a firing crack, 10 bodies for each of Examples and Comparative Examples were fired and checked in order to know how many of them had a crack. Thus, a rate of incidence of a firing crack was obtained. For reference, FIG. 1 shows a graph (DTA curve) prepared on the basis of the results of the differential thermal analysis of a polyacetal powder used as a pre former in Examples 1 to 3 and 5, and FIG. 2 shows a graph (DTA curve) prepared on the basis of the results of the differential thermal analysis of a poly(ethylene terephthalate) powder used as a pore former in Comparative Example 2.

TABLE 1

| | Pore former (combustible powder) | Exothermic ratio ($\mu V \cdot min./mg$) | Amount of addition[3] (parts by mass) | Porosity (%) | Mean pore diameter ($\mu m$) | Rate of incidence of firing crack (number of fired body having crack/total number of fired body) |
|---|---|---|---|---|---|---|
| Example 1 | Polyacetal powder[1] | 5 | 5 | 47 | 17 | 0/10 |
| Example 2 | Polyacetal powder[2] | 5 | 20 | 53 | 20 | 0/10 |
| Example 3 | Polyacetal powder[1] | 5 | 50 | 65 | 25 | 0/10 |
| Example 4 | polylactic acid resin powder[2] | 30 | 20 | 54 | 20 | 0/10 |
| Example 5 | Polyacetal powder[1] | 5 | 60 | 68 | 26 | 1/10 |
| Comp. Ex. 1 | poly(methyl methacrylate) powder | 40 | 20 | 54 | 20 | 8/10 |
| Comp. Ex. 2 | poly(ethylene terephthalate) powder | 120 | 20 | 54 | 20 | 10/10 |

[1]: Iupital (trade name) produced by Mitsubishi Engineering-Plastics Corporation was used.
[2]: Lacea (trade name) produced by Mitsui Chemicals, Inc.
[3]: Amount value with respect to 100 parts by mass of framework raw material particles.

As shown in Table 1, a crack was generated in almost all fired bodies in Comparative Examples 1 and 2, where a pore former (combustible powder) having an exothermic ratio of above 35 $\mu V \cdot min./mg$, while generation of a crack was hardly found in fired bodies in Examples 1 to 5, where a pore former having an exothermic ratio of 35 $\mu V \cdot min./mg$ or less. Incidentally, there were no large differences in porosity and mean pore diameter between Examples and Comparative Examples. There was not found any disadvantage in pore properties of the porous bodies due to the use of a pore former having an exothermic ratio of 35 $\mu V \cdot min./mg$ or less.

The present invention can suitably be used as a method for manufacturing a porous ceramic structure used as a filtration material or the like for a filter.

What is claimed is:

1. A method for manufacturing a porous ceramic structure, comprising:

firing a formed body containing ceramic particles and a combustible powder functioning as a pore former, and burning off the combustible powder to obtain the porous ceramic structure, wherein the combustible powder has an exothermic rate of 0 to 35 μV·min./mg, which is obtained from a differential thermal analysis, and the combustible powder is a powder of polylactic acid resin.

2. A method for manufacturing a porous ceramic structure according to claim 1, wherein the formed body contains the combustible powder at a ratio of 5 to 50 parts by mass with respect to 100 parts by mass of the ceramic particles.

3. A method for manufacturing a porous ceramic structure according to claim 1, wherein the porous ceramic structure is a honeycomb structure.

4. A method for manufacturing a porous ceramic structure according to claim 1, wherein the formed body contains the combustible powder at a ratio of 5 to 60 parts by mass with respect to 100 parts by mass of the ceramic particles.

* * * * *